United States Patent [19]

Bethell et al.

[11] Patent Number: 4,712,353

[45] Date of Patent: Dec. 15, 1987

[54] GAS PRESSURIZED SHOCK ABSORBER ASSEMBLY

[75] Inventors: Michael R. Bethell, Monroe; Michael G. Gaines; James F. Mowat, Jr., both of Temperance, all of Mich.; Roger D. Wheeler, Sylvania; Richard P. Woidke, Toledo, both of Ohio

[73] Assignee: Monroe Auto Equipment Company, Monroe, Mich.

[21] Appl. No.: 610,262

[22] Filed: May 14, 1984

Related U.S. Application Data

[62] Division of Ser. No. 383,949, Jun. 1, 1982, abandoned.

[51] Int. Cl.[4] ............................................. B65B 31/04
[52] U.S. Cl. .......................................... 53/80; 53/79; 53/312; 141/329
[58] Field of Search ................... 53/79, 80, 81, 82, 83, 53/381 R, 267, 403, 404, 468, 470, 88, 306, 312; 141/329, 4; 228/176

[56] References Cited

U.S. PATENT DOCUMENTS

| | | | |
|---|---|---|---|
| 1,373,275 | 3/1921 | Taylor | 141/329 |
| 2,101,156 | 12/1937 | Payne | 53/83 |
| 3,081,587 | 3/1963 | Heckethorn | 53/404 |
| 3,247,640 | 4/1966 | Miles et al. | 53/470 |
| 3,601,164 | 8/1971 | Bruce | 141/329 |
| 4,071,057 | 1/1978 | Nagase | 141/4 |
| 4,114,866 | 9/1978 | Kato | 141/4 |
| 4,131,139 | 12/1978 | Tanabe | 141/4 |
| 4,262,472 | 4/1981 | Soeda et al. | 53/403 |
| 4,446,895 | 5/1984 | Kato | 141/4 |

Primary Examiner—Robert L. Spruill
Assistant Examiner—Donald R. Studebaker
Attorney, Agent, or Firm—Thomas E. Torphy

[57] ABSTRACT

A hydraulic shock absorber is formed as a sealed assembly and subsequently, at a desired time, an opening is non-contaminantly pierced in the outer shell and the shock absorber is pressurized by passing a pressurized fluid through the opening and the opening is then non-contaminantly sealed with a metal ball by welding to make the hydraulic shock absorber permanently gas pressurized. The shock absorber assembly, the method of making it and the apparatus for making it are disclosed in this specification.

1 Claim, 14 Drawing Figures

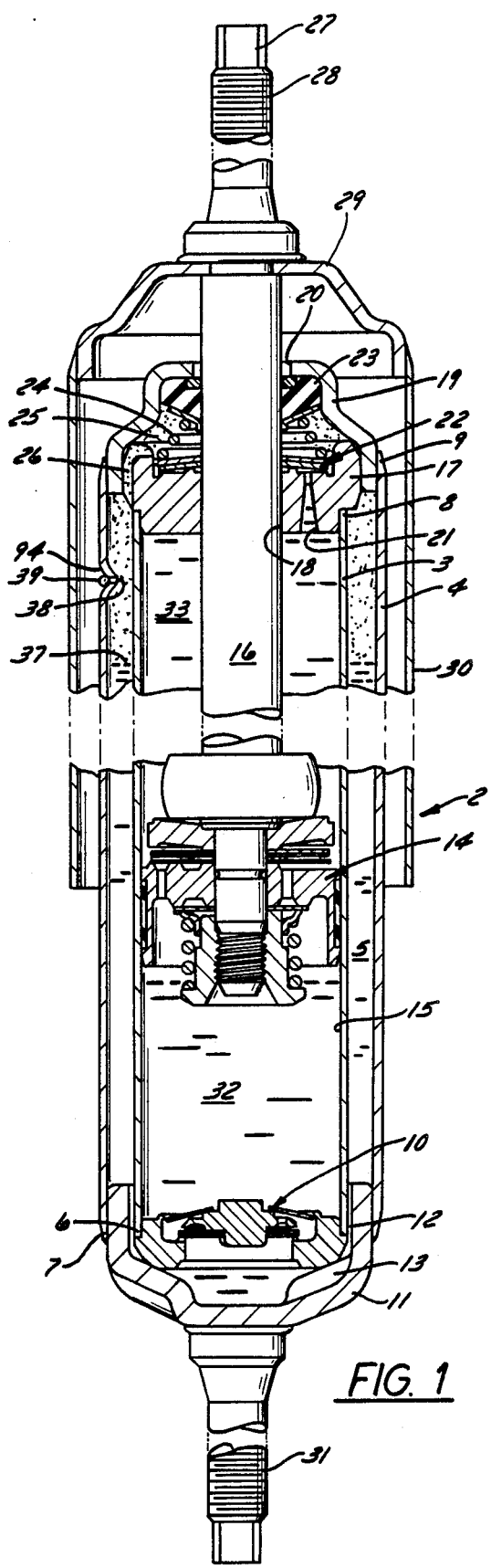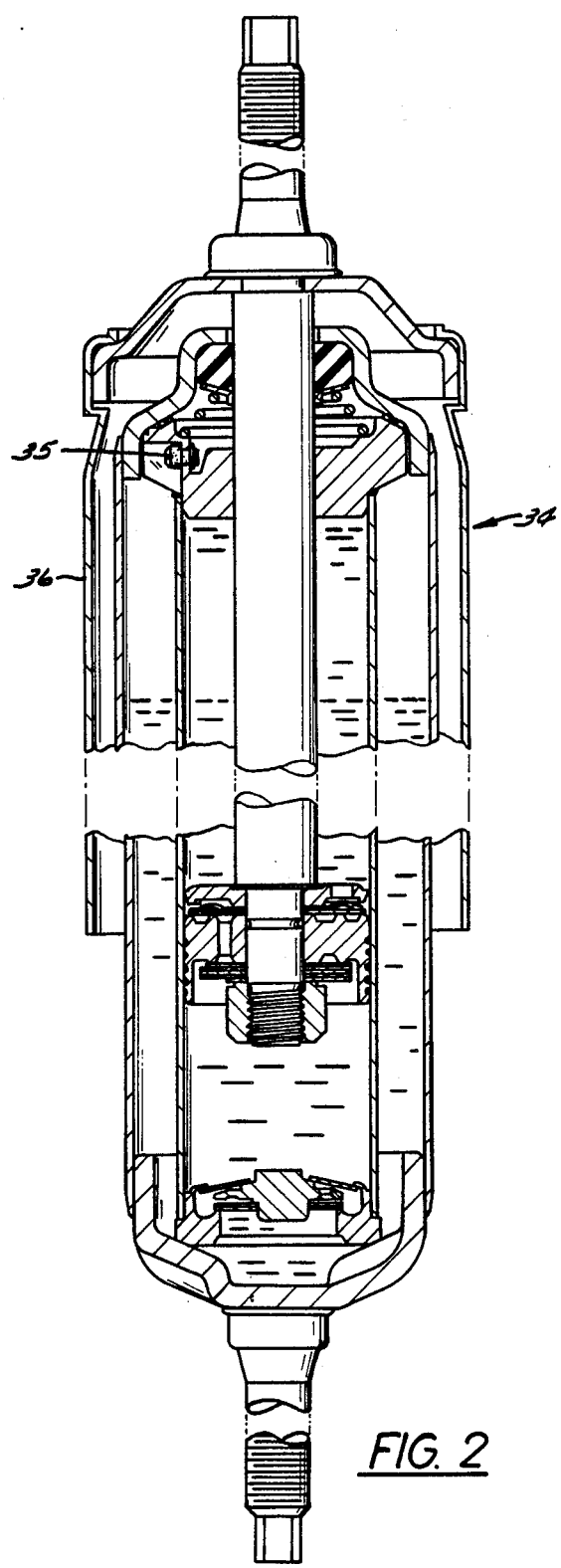
FIG. 1
FIG. 2

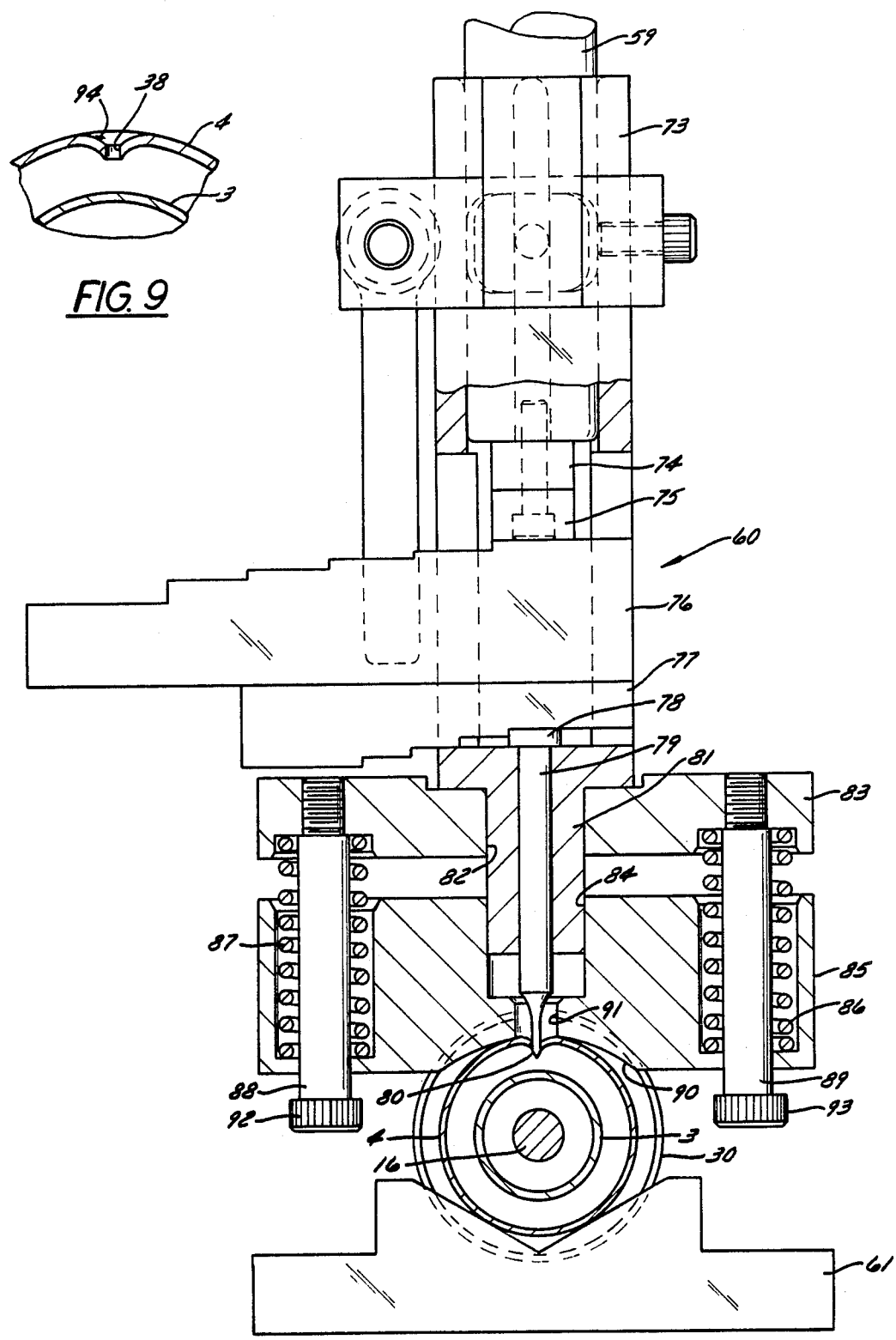

GAS PRESSURIZED SHOCK ABSORBER ASSEMBLY

This is a division of application Ser. No. 383,949, filed June 1, 1982 now abandoned.

BACKGROUND OF THE INVENTION

Gas pressurized hydraulic shock absorber assemblies are well known and have been used on vehicles for some time. Methods and apparatus for pressurizing such assemblies, and similar containers, are disclosed in issued U.S. patents.

U.S. Pat. Nos. 3,139,159, 4,114,866 and 4,131,139 each show the introduction of a pressurizing gas into a suspension unit by passing the gas past a displaceable end seal of the unit. Such a method is dependent upon the seal to move back into a sealing position to maintain the gas pressurized also, such units may be subject to depressurization during storage or use due to unintended displacement of the seal.

U.S. Pat. No. 3,975,259 shows a means of charging a shock absorber in which the piston rod, appropriately infigured, is positioned to enable introduction of a gas to the interior of a shock absorber. Recharging a shock using such an arrangement would appear to be difficult or impractical.

U.S. Pat. No. 3,081,587 discloses a method and apparatus for pressurizing an unsealed shock absorber assembly through a pre-formed opening and closing the opening using an inserted and welded plug.

U.S. Pat. No. 2,101,156 shows a machine for pressurizing a receptacle through a pre-formed opening and sealing the opening by placing a ball over it and then contacting the ball with an electrode to cause the ball to melt, flow into and sealingly unite with the opening.

Each of the disclosures in the two patents mentioned immediately above teach sealing a pre-formed opening in a liquid containing container. Pre-formed openings are disadvantageous as they must either be temporarily sealed or the container must be oriented and handled in a manner which does not allow the contained liquid to flow from the unit. Also, care must be taken to prevent the entry of contaminants, such as particulate matter or corrosive materials, into the container through the pre-formed opening prior to pressurization and sealing.

U.S. Pat. No. 3,736,645 shows a ball jammed into a pre-formed opening used to pressurize a shock absorber for a vehicle bumper. The ball is maintained in a sealing position in the opening by welding.

SUMMARY OF THE INVENTION

This invention relates to gas pressurization of hydraulic shock absorber assemblies which are assembled and sealed units prior to pressurization. The assembly is then preferably oriented to a horizontal or near horizontal position. The piston rod is withdrawn to its substantial maximum extent from the assembly to create a maximum liquid free void in the assembly, and an opening having a pre-entrant conical seat is pierced in the outer shell or reserve tube of the assembly.

A work chamber is then placed in sealed fluid flow communication with the newly formed seat and opening, gas is introduced through the opening and a ball is placed in the seat and welded to an annular portion of the outer shell surrounding the opening to maintain the assembly at a substantially constant gas pressure by permanently sealing the opening in a non-contaminant manner.

BRIEF DESCRIPTION OF THE DRAWINGS

FIG. 1 is a full cross sectional view showing one embodiment of a shock absorber having the structure of, and formed by the process and apparatus of the invention;

FIG. 2 is a full cross sectional view showing an alternate embodiment of a completed shock absorber assembly prior to being pressurized by the method and apparatus of this invention;

FIG. 8 is an enlarged sectional view of a portion of the apparatus shown in FIG. 6;

FIG. 9 is enlarged sectional view of the opening formed by the apparatus of FIG. 8;

DETAILED DESCRIPTION OF THE PREFERRED EMBODIMENT

Figure 3:
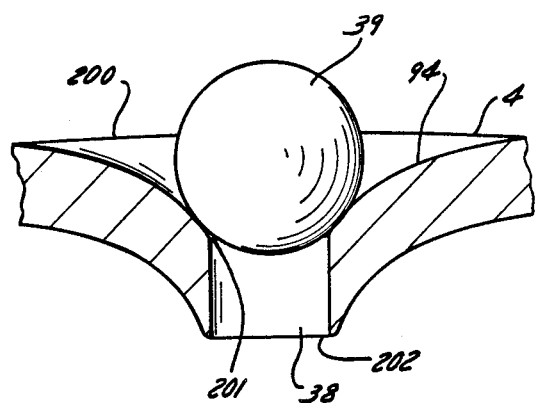
FIG. 3 shows a ball plug with respect to a pierced opening prior to welding.

FIG. 1 shows, in full cross section, one form of a pneumo-hydraulic or gas over oil shock absorber assembly 2. The assembly 2 has a pressure tube 3 and a reserve tube 4. Tube 4 is concentric with and radially outwardly spaced from tube 3 to form an annular reserve chamber or fluid resevoir 5.

Tubes 3 and 4 have a first or lower end 6 and 7, respectively, and a second or upper end 8 and 9, respectively. A base valve assembly 10 selectively closes end 6 of pressure tube 3 and an end closure cap 11 seals first end 7 of tube 4. Cap 11 is sealing engaged to tube 4 by appropriate means, such as welding. Cap 11 serves to maintain the first ends of tubes 3 and 4 concentric and via flow passages 12 and 13 allows fluid communication between the interior of pressure tube 3 and reserve chamber 5 via fluid pressure responsive base valve 10.

A piston assembly 14 is sealingly and slidably engaged with the interior wall 15 of tube 3. A piston rod 16 is sealingly engaged with piston assembly 14. Rod 16 extends out through end 8 of pressure tube 3.

A rod guide 17 is sealingly engaged with end 8 of pressure tube 3. Rod guide 17 has a central opening 18 through which rod 16 extends and is allowed to reciprocate. An end closure cap 19 having a central rod receiving opening 20 is sealingly engaged to end 9 of reserve tube 4 by appropriate means, such as welding. End closure cap 19 coacts with rod guide 17 to maintain ends 8 and 9 of tubes 3 and 4, respectively, concentric. A fluid flow opening 21 is provided in rod guide 17. Opening 21 is selectively blocked by valve assembly 22. A resilient seal member 23 prevents fluid flow through opening 20 and a helical spring 24 serves to urge seal member 23 into sealing engagement with cap 19 and valve assembly 22 into engagement with rod guide 17. The space between the seal member 23 and rod guide 17 forms a seal chamber 25. A passage 26 in rod guide 17 places the seal chamber 25 in fluid flow communication with reserve chamber 5.

Adjacent an upper end 27 of rod 16, an attachment means, such as threaded stem 28, is provided to attach the rod to an appropriate mass, such as the sprung mass of a vehicle. Adjacent stem 28 is a dust cover cap 29 rigidly secured to rod 16. Rigidly secured to cap 28 is a dust tube 30 which is concentric with and outwardly spaced from reserve tube 4.

At the lower end of the assembly 2 an attachment means, such as threaded metal stem 31 is rigidly attached, such as by welding, to end cap 11.

Piston assembly 14 reciprocates in pressure tube 3 and forms a lower pressure chamber 32 and an upper pressure chamber 33 in pressure tube 3. Each of these two pressure chambers are variable volume chambers which change in volume as the piston moves in the pressure tube.

Under normal conditions the pressure chambers 32 and 33 are filled with oil and the reserve chamber of reservoir 5 is partially filled with oil. Therefore, in normal manufacture only an upper portion of reservoir 5 and seal chamber 25 are not filled with oil, but are occupied by air.

To obtain additional ride control it has been found beneficial to have these air occupied spaces filled with a gas under pressure.

FIG. 2 shows as an alternate embodiment a pneumohydraulic shock absorber assembly 34. This embodiment does not have a flow port in the rod guide and it has a one-way check valve formed from a enlarged head rubber plug 35.

Also, embodiment 34 has a snap-on plastic dust tube 36. In all other respects embodiment 34 is substantially identical to the assembly 2 of FIG. 1.

For purposes of illustration only the shock absorber of FIG. 2 is shown completely assembled and filled with the desired amount of hydraulic oil. In accordance with the invention disclosed herein the assembly shown in FIG. 2 is a typical sealed shock absorber assembly which is as yet unpressurized by a gas, such as nitrogen. In the condition shown the assembly 34 may be stored in any position without need of any supplemental sealing until such time as it is desired by inventory needs or manufacturing capacity to pressurize the shock absorber assembly with a gas. As there is no pre-formed opening in the assembly concern for oil spillage or contamination of the interior of the shock during storage prior to pressurization is unnecessary.

The assembly 2 shown in FIG. 1 is a typical gas pressurized shock absorber which has been taken from storage in substantially the condition of the assembly 34 of FIG. 2 and pressurized with a gas which occupies that portion of the reserve chamber 5 above oil level 37 and the seal chamber 25, as indicated by stippling.

An opening 38 is non-contaminantly pierced in a portion of the reserve tube wall contiguous with the liquid free space above the oil level 37 in reserve chamber 5 and after a pressurized gas is placed in the assembly through the opening a spherical plug 39 is non-contaminantly sealingly welded to an annular portion of the shell surrounding the opening to permanently seal the opening and maintain the assembly pressurized.

For purposes of this disclosure the term piercing is defined as penetrating the metal wall to maintain the metal as a cohesive mass while displacing a portion of the metal of the wall to form an opening in the wall without separating or removing any metal from the wall. In other words, the opening is formed by relocation of the metal without removal of any metal from the wall. Therefore, no particles or contaminants are introduced into the interior of the container by formation of the opening.

FIG. 3 is an enlarged sectional view of opening 38. The ball plug 39 is shown with respect to opening 38 prior to welding of the ball.

Figure 4:
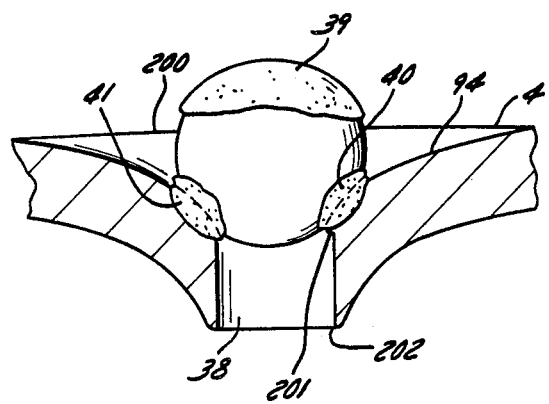
FIG. 4 shows the ball plug of FIG. 3 after welding.

After welding, as shown in FIG. 4, a continuous annular portion 40 of the ball 39 is fused to a continuous annular portion 41 adjacent to and completely surrounding opening 38 to seal the opening.

The welding of the plug to the surface of the metal wall surrounding the opening is critical to the success of the closure. No weld spatter or expulsion of metal into the interior of the shock absorber assembly can be tolerated. Also, to insure that no foreign matter is introduced into the interior of the shock absorber assembly no melt down of the plug into the opening is acceptable. Therefore, the plug is welded so that no substantial portion of the opening is occupied by the ball. That is, after welding, the opening remains substantially completely empty or devoid of any matter except, of course, the fluid occupying the interior of the assembly.

As shown in FIGS. 3 and 4, a pre-entrant indention or radially inwardly extending depression 94 is formed between the normal level 200 of the exterior surface of the wall of the reserve tube 4 and the exterior terminal end 201 of opening 38. Indention or depression 94 has substantially an inverted truncated cone shape and has sufficient volumetric capacity to receive at least one half or more of a ball seated surrounding the end 201 of opening 38. The ball is thus sufficiently depressed below the normal level 200 of the reserve tube wall so that an object, such as the edge of the dust tube, will be deflected outwardly by the surface of the ball to cause the object to ride over the ball rather than dislodge it.

Opening 38 extends through the wall of tube 4 and terminates at an inner end 202 on the interior surface of tube 4.

Figure 5:
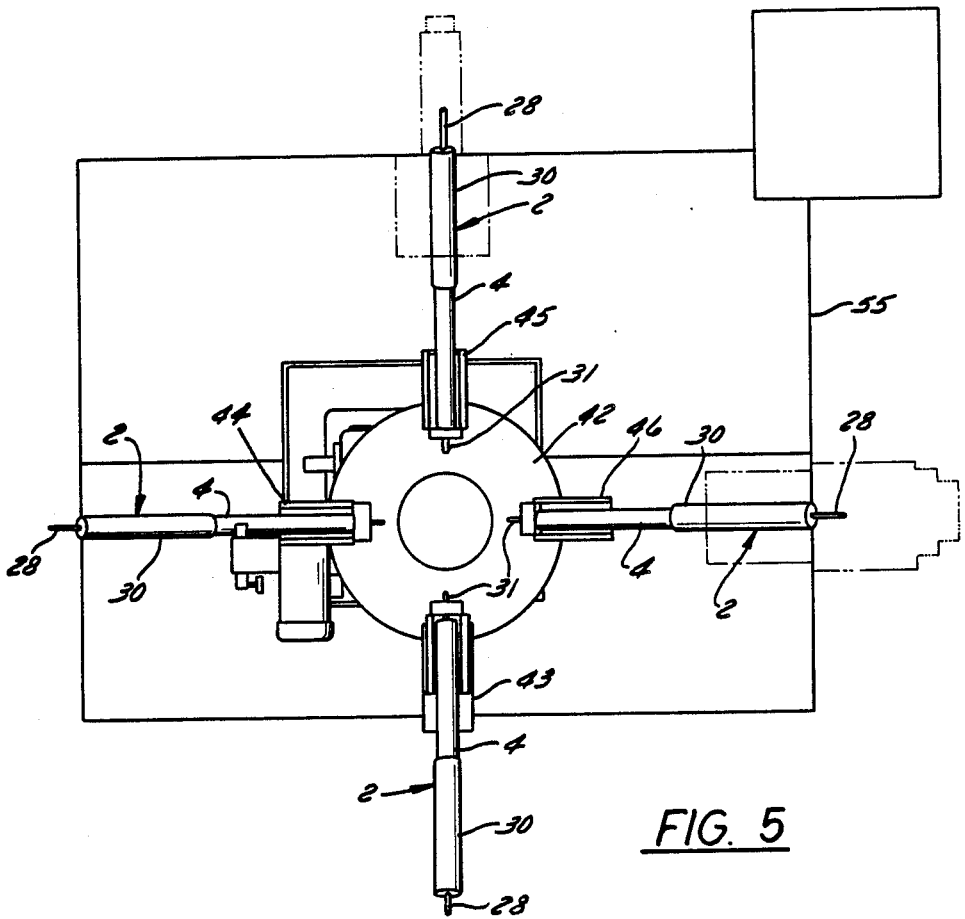
FIG. 5 is a schematic plan view of the apparatus for piercing, pressurizing and sealing a shock absorber assembly.

The apparatus for piercing, pressurizing and plugging a sealed shock absorber assembly is shown in a schematic plan view in FIG. 5. A four position indexing table 42 contains four substantially identical shock absorber assembly holding fixtures 43, 44, 45, and 46.

Fixture 43 is shown in the load, unload position where a shock absorber assembly, such as assembly 2 of FIG. 1, is fully extended by withdrawing the piston rod from the shock absorber to the maximum extent so the reserve tube 4 is substantially removed from dust tube 30 and then positioned in the fixture. The fixture 44 is shown at a vacant work station. Fixture 45 is at the work station where the opening 38 is formed in the reserve tube 4. Fixture 46 is at the work station where a pressurized gas is placed through the opening and the ball is placed adjacent the opening and welded.

Indexing table 42 serially indexes a shock absorber assembly placed in a fixture to each work station where the shock assembly is, at the position of fixture 43 loaded, at 44 dwells, at 45 is pierced, at 46 is pressurized and sealed and, returning again to the position of fixture 43, is removed from the fixture.

Figure 6:
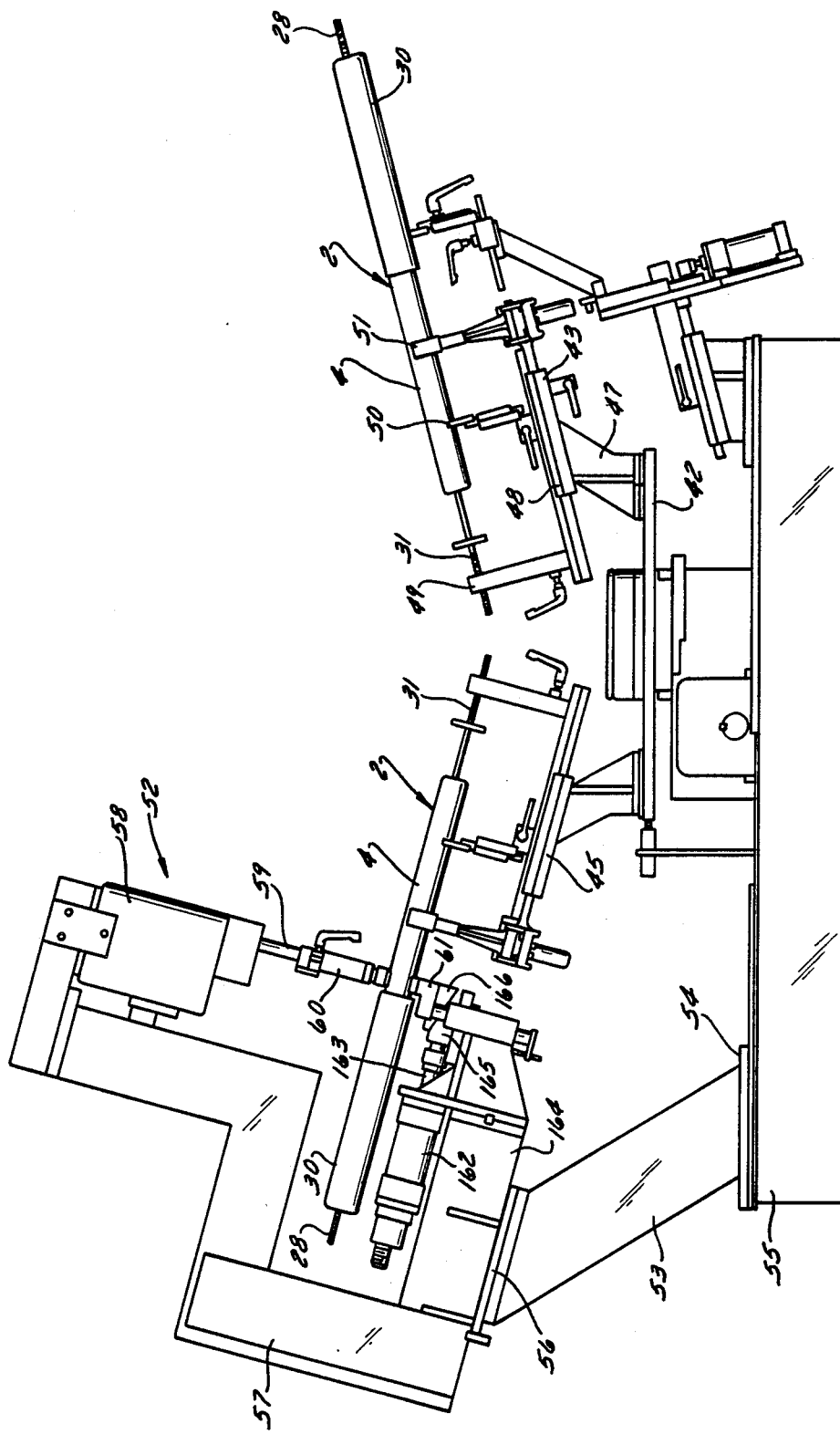
FIG. 6 is an elevation view of the apparatus used to pierce the opening in a sealed shock absorber assembly.

FIG. 6 shows an elevation view of the apparatus at the position of fixtures 43 and 45 of FIG. 5. Fixture 43, shown in the load, unload position, and typical of the structure of all the fixtures, is affixed to rotatable index table 42 by pedestal 47. Fixture body 48 is affixed to the upper end of pedestal 47. Appropriate shock assembly holding means, such as stem holder 49 and V-block assemblies 50 and 51 are adjustably attached to fixture body 48.

At the position of fixture 45 piercing apparatus 52 is shown. A support pedestal 53 having a lower end 54 rigidly affixed to stationary base 55 and an upper end 56 affixed to a main frame 57 rigidly supports the piercing apparatus 52 with respect to stationary base 55 and rotatable indexing table 42. A high speed press, such as air operated toggle press 58, is affixed to the main frame. A depending press ram 59 extends toward the shock assembly reserve tube 4 and a piercing assembly 60 attached to press ram 59 extends to and selectively contacts the reserve tube 4. A work station stock support block 61 contacts the lower portion of reserve tube 4 diametrically opposite the upper portion contacted by piercing assembly 60. Assembly 60 is raised and block 61 lowered upon completion of the piercing operation so that they do not contact reserve tube 4. The indexing table 42 then rotates to carry the pierced shock absorber to the fill and weld station and another sealed, unpressurized assembly to the piercing work station. Upon completion of the indexing the support block 61 and piercing assembly 60 are automatically moved into contact with reserve tube 4 to respectively support and pierce the reserve tube.

Figure 7:
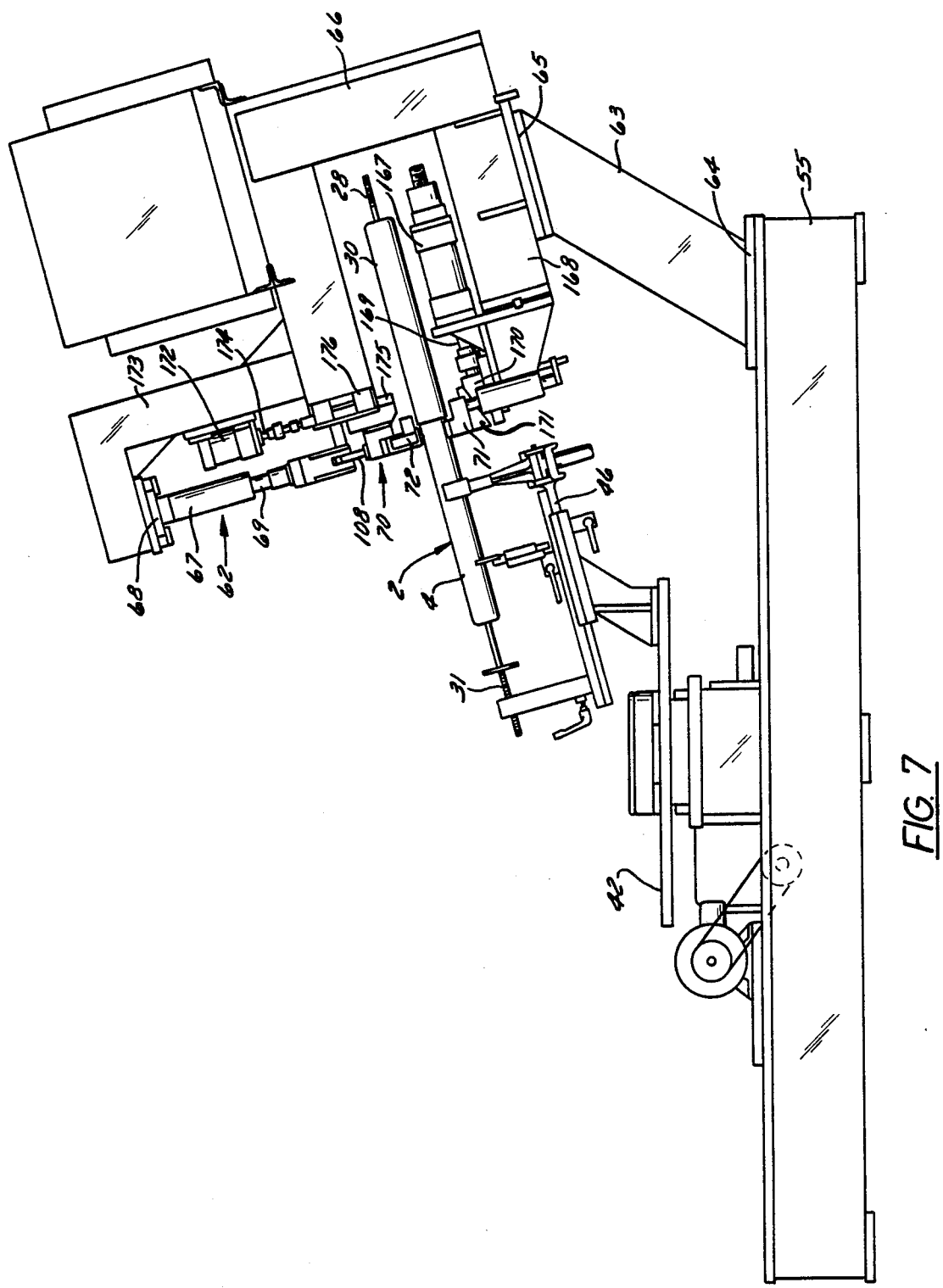
FIG. 7 is an elevation view of the apparatus used to pressurize and seal a shock absorber assembly.

FIG. 7 shows the pressurize and plug apparatus 62 located at the position of fixture 46 in the plan view of FIG. 7. Apparatus 62 is supported above stationary base 55 by a support pedestal 63 having a first end 64 rigidly affixed to base 55 and a second end 65 rigidly affixed to a main frame 66. Apparatus 62 has an air cylinder 67 having an end 68 mounted to a portion of main frame 66. An air cylinder ram 69 depends from air cylinder 67 and has affixed to it a welding electrode 108. Electrode 108 extends into a ball and gas feed and electrode work chamber assembly, generally identified by reference numeral 70. This assembly 70 is described in greater detail below.

Apparatus 62 is provided with a shock absorber assembly support block 71, shown in its support position, which supports reserve tube 4 diametrically opposite the pierced opening which is surrounded and sealed by work chamber head 72 of assembly 70. The work chamber head 72 and support block 71 move up and down, respectively, away from reserve tube 4 after completion of the charge and weld operation to enable the completed shock absorber assembly to be indexed out of apparatus 62 and allow a pierced assembly to be indexed into an operative position with respect to apparatus 62. Upon completion of the indexing function block 71 and head 72 move toward and contact reserve tube 4 as shown in FIG. 7 to respectively support and seal the tube.

FIG. 8 is a sectional view of the portion of the apparatus 52 between press ram 59 and V-block 61 shown in FIG. 6.

A punch ram attachment assembly 73 is removably attached to ram 59 and a spacer 74 and stop 75 are positioned within the housing at the end of the ram 59.

A first adjusting block 76 is in contact with stop 75 and a second adjusting block 77 is in contact with block 76.

Adjusting block 77 is in contact with the head 78 of a piercing tool 79 having a piercing end 80. Tool 79 is carried in a tool holder 81. Holder 81 is placed in an opening 82 in a spring pad 83. Holder 81 extends into an opening 84 in a pressure pad 85. Holder 81 and punch 79 are allowed to reciprocate within opening 84 with respect to pressure pad 85.

A pair of die springs 86 and 87 are interposed between spring pad 83 and pressure pad 85 and resiliently urge the pads away from each other. A pair of shoulder screws 88 and 89 limit the distance pads 83 and 85 can move from each other and also maintains the two pads and the springs as an assembly.

Pressure pad 85 has a concavity 90 having an opening 91 in it. The piercing end 80 is oriented to reciprocate through opening 91. Concavity 90 is positioned to receive the reserve tube 4 of a shock absorber assembly. The shock absorber assembly is firmly retained between pressure pad 85 and V-block 61. As shown in FIG. 8 the tool has just pierced an opening in reserve tube 4. The press ram 59 is then retracted simultaneously retracting the entire piercing assembly 60, with the exception of the pressure pad 85 which lags until it contacts the heads 92 and 93 of bolts 88 and 89. Upon contacting the heads of the bolts the pressure pad also moves upward and V-block 61 moves downward whereby conventional control means of the machine index the table to move the pierced shock absorber assembly to the next work station and another sealed shock absorber assembly is indexed into position with respect to piercing apparatus 52 for being gripped between block 61 and press pad 85 and being pierced.

FIG. 9 shows an enlarged sectional view of the opening 38 pierced in reserve tube 4 by the apparatus shown in FIG. 8. As shown in FIG. 1 and in FIG. 9 pressure tube 3 is concentric with and radially inwardly spaced from reserve tube 4. Due to the need for a piston assembly to sealingly reciprocate within pressure tube 3 it is of critical importance that the piercing tool not contact and deform the wall of pressure tube 3 while piercing the opening 38 in reserve tube 4.

Opening 38, by being pierced rapidly in tube 4 and due to the piercing tool having a sharp point following by a cylindrical section, is a non-contaminant opening in that the metal is forced inward and simultaneously extruded radially outwardly away from the center of the punch. That is, no separated metal particles are formed during the piercing operation as the metal is displaced rather than removed from the wall. Upon impact of the punch point with the wall of the reserve tube the metal surrounding the point of impact is deflected inward to form an indented, substantially inverted cone shaped, ball seat 94 at the entrance to substantially cylindrical opening 38.

Figure 10:
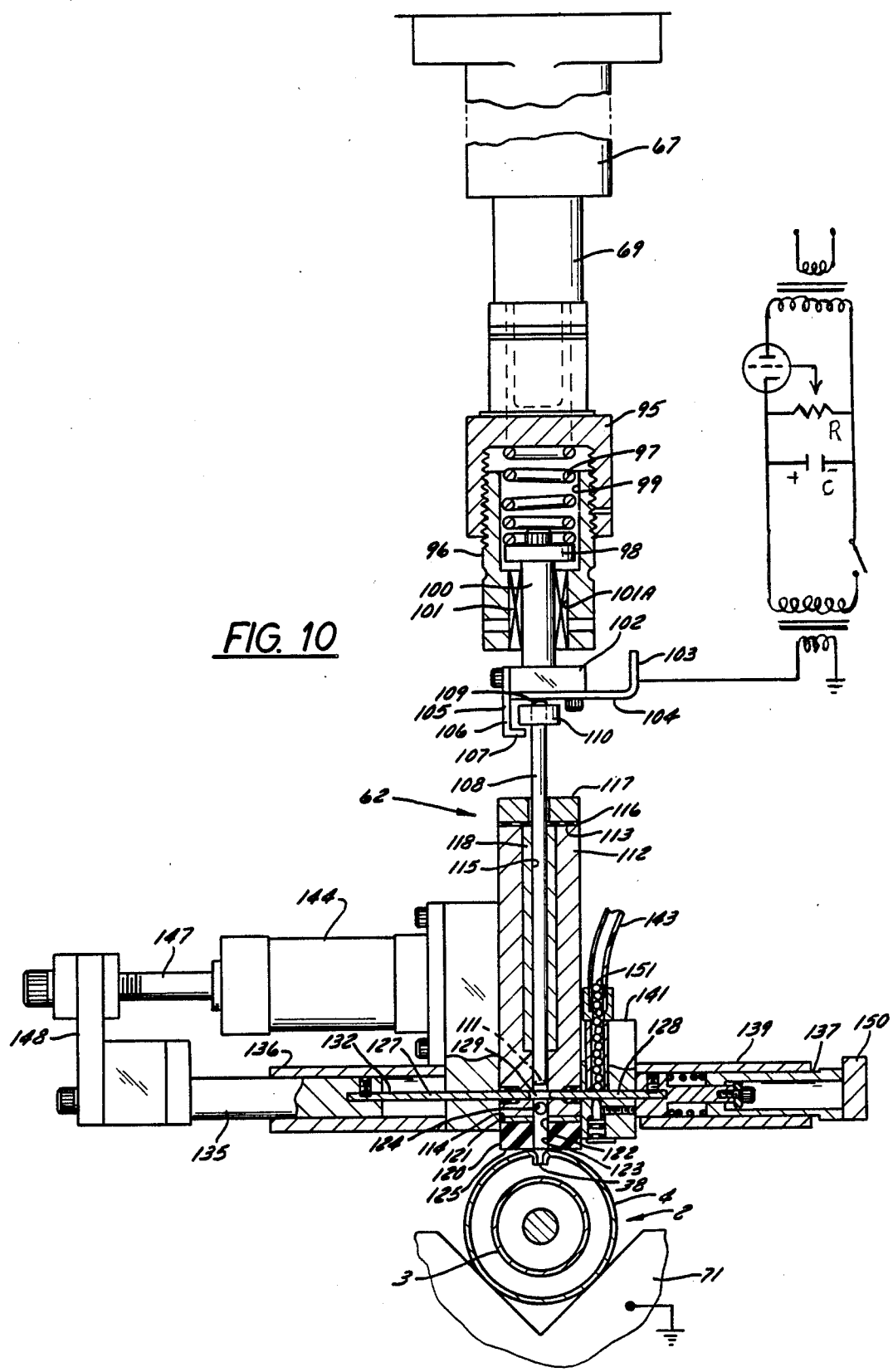
FIG. 10 is an enlarged sectional view of the apparatus shown in FIG. 7.

FIG. 10 is a cross sectional view of that portion of the gas charge and seal apparatus 62 shown in FIG. 7 between air cylinder 67 and support block 71. Affixed to cylinder ram 69 is an internally threaded cylindrical end cap 95. A cylindrical connector member 96 is threadedly engaged with end cap 95. Interposed between cap 95 and member 96 is a helical spring 97 and a spring pad 98. Spring pad 98 is free to reciprocate against the urging of spring 97 within a substantially cylindrical cavity 99 in connector member 96. Spring pad 98 is rigidly affixed to a connector rod 100 which is capable of reciprocation in a bushing 101. Bushing 101 is retained within opening 101A in connector member 96 by appropriate means, such as being force fitted into the opening.

An insulative or dielectric mounting block 102 is affixed to the lower end of connector rod 100. A conductor connection 103 is affixed to mounting block 102 and has a horizontally extending portion 104 which extends acrossed a portion of the lower surface of the mounting block 102. A representative capacitive discharge welding circuit is shown connected to conductor connection 103. A lift bar 105 is also affixed to mounting block 102. Lift bar 105 has a vertically depending portion 106 which extends downward from mounting block 102 and a horizontal portion 107. Beneath mounting block 102 is an electrode 108. Electrode 108 has a first or upper end 109 in electrical contact with portion 104 of conductor connection 103.

A pick-up member 110 is affixed to electrode 108 adjacent end 109. Pick-up member 110 is sized and arranged to interferingly engage horizontal portion 107 of lift bar 105.

Electrode 108 extends downwardly and terminates in a second or lower end 111. End 111 of the electrode is provided with a concavity in its end surface to provide greater surface contact between the electrode and a spherical plug. A substantial lower portion of electrode 108 is reciprocal within a die block 112 having a first or upper end 113 and a second or lower end 114 and a longitudinally extending bore 115 which extends between ends 113 and 114. Upper end 113 of die block 112 is closed around electrode 108 by a rubber gasket 116 which is bonded to end 113 of die block 112 and a top cap 117 which is bonded to gasket 116. An elongated seal means, such as bushing 118, surrounds and substantially sealingly engages electrode 108 and enables the electrode to reciprocate within the bushing.

Lower end 114 is provided with a resilient seal member 120 having a sealing gasket 121. Gasket 121 is sealingly bonded to lower end 114 of die block 112 and resilient seal member 120 is sealingly bonded to the gasket. An opening 122 and 123 in gasket 121 and seal member 120, respectively, is aligned with opening 115 in die block 112 to enable electrode 108 to reciprocate in openings 122 and 123. A gas feed opening 124 connected in fluid flow communication with a pressurized gas feed system shown schematically in FIG. 13 and described in greater detail later in this disclosure provides means for flowing a pressurized gas through the lower end of bore 115 and openings 122 and 123. Resilient seal member 120 has a terminal end 125 which selectively seals and unseals opening 123 with respect to ball seat 94 and opening 38 of reserve tube 4 of a shock absorber assembly 2 retained within V-block 71.

Figure 11:
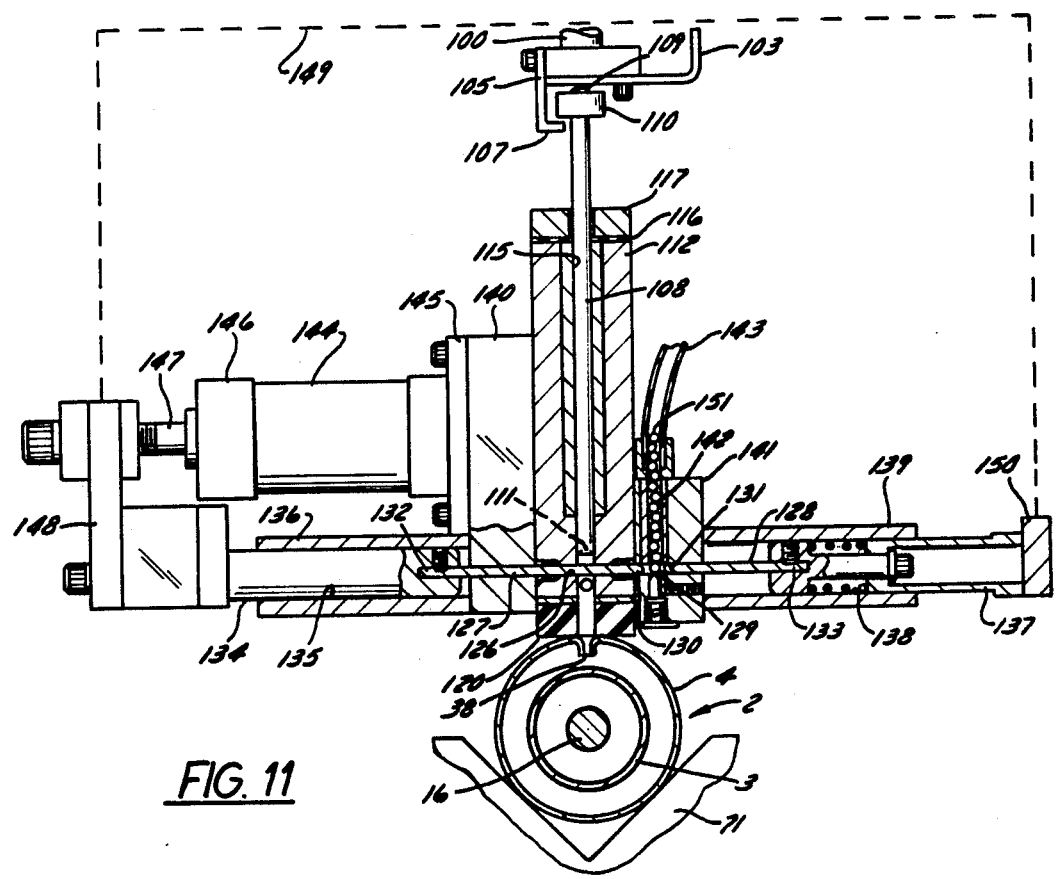
FIG. 11 is a partial view of FIG. 10 in which the ball shuttle is shown picking a ball.

Referring now to FIG. 11 a ball feed bore 126 is provided through die block 112. Bore 126 is transverse to the longitudinal axis of die block 112 and intersects bore 115. Ball shuttle means comprising a pair of shuttle rods 127 and 128 are reciprocatable within bore 126. A ball receiving opening or space 129 is provided between the inner terminal ends 130 and 131 of rods 127 and 128, respectively.

Each shuttle rod 127 and 128 have an outer terminal end 132 and 133, respectively. End 132 of the shuttle rod 127 is rigidly affixed to a bearing shaft 134 which is reciprocatable with a bore 135 of a support member 136. End 133 of shuttle rod 128 is rigidly affixed by means, such as a conventional threaded set screw, to a bearing shaft 137 which is reciprocatable within a bore 138 of a support member 139. Support member 136 is rigidly affixed to a mounting block 140 and support member 139 is rigidly affixed to a mounting block 141.

Mounting block 141 has a bore 142 which communicates with ball feed bore 126 in die block 112. A ball feed conduit, such as resilient tube 143 is placed in communication with ball feed bore 142.

Reciprocating means, such as air cylinder 144, has a base end 145 attached to mounting block 140 and a ram end 146 extending away from the mounting block. A power ram 147 extends out from end 146 and, powered by compressed air, is reciprocatable with respect to the air cylinder.

A connection means, such as tie plate 148, substantially rigidly connects ram 147 to bearing rod 134. This connection causes shuttle rod 127 to reciprocate within bore 126 in response to reciprocation of ram 147 with respect to air cylinder 144. Not shown, but represented by dotted line 149, is a substantially rigid connection means between ram 147 attached to bearing rod 134 by tie plate 148 and a tie plate 150 attached to bearing rod 137. Rigid connection means 149 serves to maintain a fixed relationship of the ball shuttle rods with respect to each other. Thus, when ram 147 reciprocates each ball shuttle rod 127 and 128 reciprocates within bore 126 and maintain the ball receiving space between their inner ends 130 and 131, respectively.

The actual structure of the rigid connection of tie rod 149 is conventional construction placed behind the structure shown in FIG. 11 and no novelty resides in the specific structure. Therefore, it is not shown in detail.

Figure 12:
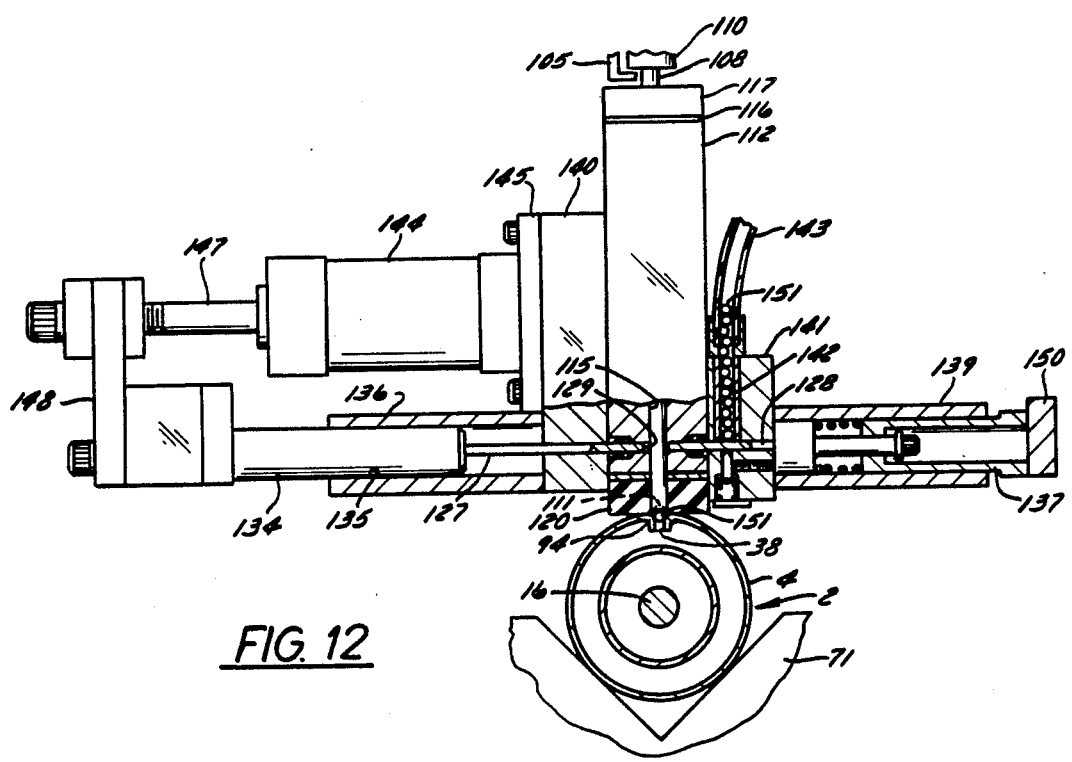
FIG. 12 shows the apparatus of FIG. 11 in which the ball is seated adjacent the opening and being welded.

FIG. 12 is a view of the apparatus shown in FIG. 11 in which a ball 151 is positioned in the indented inverted conical ball seat and the electrode is shown in position to weld the ball to the seat. To go from the ball pick-up position shown in FIG. 11 to the position shown in this view the ram 147 of cylinder 144 is powered to the left causing shuttle rod 127 and shuttle rod 128 to move to the left with one spherical plug member or ball occupying space 129 betwen the shuttle rods. As space 129 becomes aligned with bore 115 the ball is impelled by gravity to fall down the remaining lower end of bore 115 and through openings 122 and 123 to be seated in the conical seat 94 adjacent opening 38. Powered by the air cylinder 67 shown in FIG. 10 the electrode is then moved downwardly in bore 115 to contact the ball in the seat and weld it to the seat.

Figure 13:
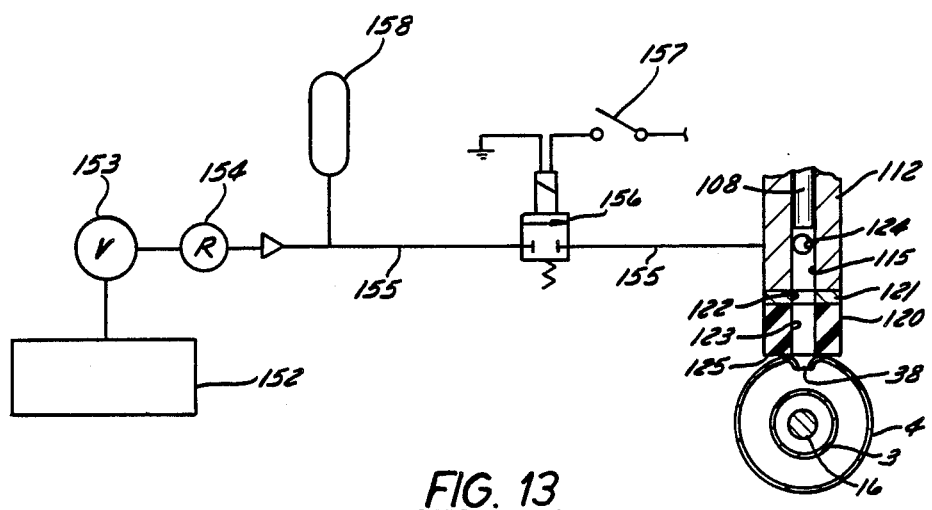
FIG. 13 is a schematic showing the gas charging controls.

FIG. 13 is a schematic showing the gas charging system used to pressurize shock absorber assemblies. A source of pressurized gas, such as gas cylinder 152, has a manually operated valve 153 which is open during operation and closed when the apparatus is not being used. A pressure regulator 154 is provided to maintain the pressure constant. Pressure tank 152 is connected in fluid flow communication with opening 124 in bore 115 of die block 112 by appropriate means, such as conduit 155. An appropriate gas flow control means, such as undirectional solenoid operated valve 156 which is normally closed and opens in response to an appropriate control means, such as switch 157 is placed in conduit 155.

An accumulator, such as accumulator 158 is preferably provided between regulator 154 and valve 156 to provide a ready reserve of gas at the desired pressure.

Referring again to FIG. 6, an air cylinder 162 having a ram 163 is mounted on bed 164 of the main frame 57 of piercing apparatus 52. Affixed to ram 163 is a wedge member 165. Wedge member 165 coacts with a complementary wedge member 166 to raise and lower V-block 61 as the cylinder ram 163 is extended or retracted, respectively.

Also, referring now to FIG. 7, an air cylinder 167 is mounted on bed 168 of the main frame 66 of the gas charging and welding apparatus 62. Air cylinder 167 has a ram 169. Affixed to ram 169 is a wedge member 170. Wedge member 170 coacts with a complementary wedge member 171 to raise and lower the V-block 71 to provide support for reserve tube 4 and to withdraw the V-block from contact with the reserve tube to facilitate indexing stock table 42.

An air cylinder 172 is mounted on upright 173 of main frame 66. Air cylinder 172 has a ram 174 which extends downwardly and is affixed to a slide 175. Slide 175 is mounted in a guide member 176. Affixed to slide 175 is work chamber head 72. Air cylinder 172 places the work chamber head 72, with resilient seal member 120, in sealing engagement with a shock absorber assembly and, after the assembly has been pressurized with a gas and sealed, the air cylinder raises the working head clear of the shock absorber assembly so the table can index to the next station.

Figure 14:
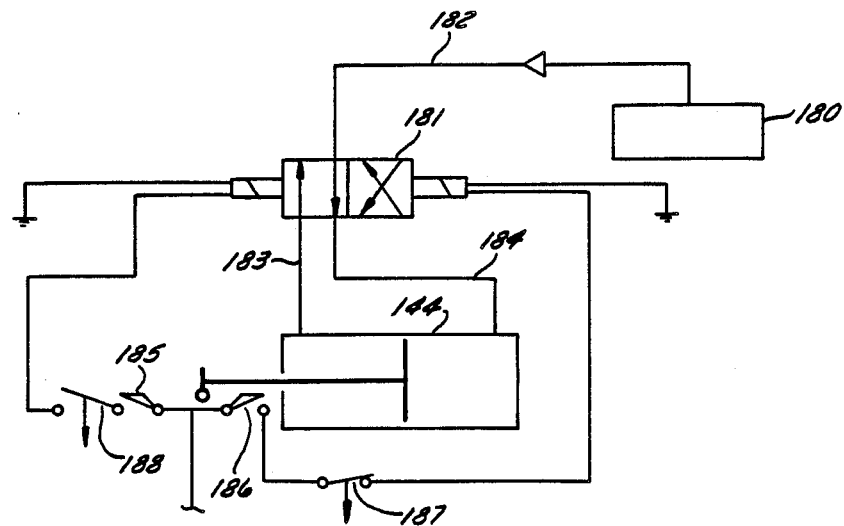
FIG. 14 is a schematic showing the ball shuttle controls.

FIG. 14 is a schematic showing appropriate control means for air cylinder 144, shown in FIG. 10, which powers the ball shuttle function. A source of pressurized air 180 is in fluid flow connection to a flow control means, such as solenoid operated, two position valve 181 by conduit 182. The valve is placed in fluid flow connection with cylinder 144 by appropriate means, such as conduits 183 and 184.

Appropriate electrical control means, such as limit switches 185 and 186, are operative in response to ram position. Time delay means, such as time delay switches 187 and 188, serve to cause the cylinder ram to dwell for a desired increment of time at each end of its power stroke.

Practice of the process and operation of the apparatus herein disclosed is as follows.

A sealed shock absorber assembly is extended fully, i.e. the piston rod is removed from the assembly to its maximum extent and loaded onto the loading fixture.

The assembly is ultimately indexed into the piercing station where a V-block is raised up by an air cylinder powered wedge acting on a wedge member attached to the V-block. Substantially diametrically opposite that portion of the reserve tube supported by the V-block the reserve tube of the assumbly is contacted by the pressure pad descending as the first component of the toggle press ram mounted piercing work head.

The pressure pad contacts the reserve tube with a concave section to maintain the reserve tube firmly held between the pressure pad and the V-block as the press ram rapidly forces the piercing tool through an opening in the pressure pad and indents and pierces the reserve tube in a non-expulsive, non-particle forming manner whereby no contaminating particulates are placed or forced into the interior of the reserve tube. The pierced opening is non-contaminating as the metal is forced radially inwardly with respect to the reserve tube to form the indented substantially inverted cone shaped ball seat on the surface of the reserve tube and the metal is deformed or extruded radially outwardly with respect to the longitudinal axis of the penetrating piercing punch whereby the metal is deformed by metal flow into a substantially cylindrical opening in the tube wall.

For steel tube having a wall thickness of about 0.050 of an inch one hit with the forming tool is sufficient to form the opening. However, for thicker walled steel tube, such as 0.100 of an inch wall thickness used on some suspension units, such as MacPherson type struts, it is felt two hits is preferable. That is, a first punch will form the depression and a second punch will form the opening at the bottom of the depession. The first work station has been provided for such a purpose.

The press ram then retracts to withdraw the piercing work head upwardly free of the reserve tube and the V-block retracts downwardly by retraction of the air cylinder powered wedge. The shock absorber assembly is now free of physical contact with the piercing work station and is indexed to the gas charging, ball plug and weld seal work station.

Upon being indexed into the charge and seal station the V-block ascends by the same type of air cylinder driven wedge used for the pierce station to contact a preselected lower portion of the reserve tube.

Then the ball shuttle and gas flow work head is forced downward by the air cylinder powered slide guided in the way fixture until the first component of the work head, the resilient seal aember, contacts and seals around the indented and pierced opening in the reserve tube.

After the seal is sealed around the opening gas flows through the bore above the seal. The ball shuttle comprised of the two rods with the ball receiving fixed space between their inner ends then pick up a ball from the ball hopper feed outlet and convey the ball through the shuttle rod bore to the gas charging bore, which the weld electrode also reciprocates in. The ball drops down the charging and electrode travel bore, impelled by gravity, after the shock absorber assembly has been fully charged. Premature placement of the ball plug in the gas charging bore may hinder or even prevent gas from flowing to the interior of the shock absorber assembly.

As the ball drops down the bore it is received and cradled by the inverted cone shaped indentation surrounding the outer end of the pierced opening in the reserve tube. Also it is followed down the bore by the weld electrode. As the bore is still pressurized to the same pressure as the shock absorber assembly there is no pressure differential acrossed the opening in the reserve tube and a continuous annular portion of the ball plug is in contact with a continuous annular portion of the inverted cone shaped conical seat surrounding the opening.

Upon contact of the end of the electrode with the seated ball a capacitative discharge welding unit electrically in contact with the electrode is discharged to provide a controlled quantity of electrical energy as a heat input to the ball. This energized heat input is very short in duration and intense in degree. The electrode continues to impose a controlled follow through force on the ball as the heat input is supplied to the ball. The result is a low melt forge type weld free from expulsion or extrusion of molten metal or metal particles into the reserve tube. The ball is characteristically fused to the metal surrounding the opening and the opening remains occupied only by the fluid and substantially free of metal to enhance to the maximum the chances for a non-contaminant seal.

As a specific example, welds such as shown in FIG. 4 were made in which the tube wall thickness was 0.035 of an inch, the pierced opening had a nominal diameter of 1/16 of an inch and the steel ball was 3/32 of an inch in diameter. These welds were made with a capacitive discharge weld system which provided a welding current of about 6500 to 7500 amps at about 4.0 volts for a time duration of 0.005 to 0.006 of a second through the weld electrode. The electrode was subjected to a follow up forging pressure of about 200 lbs.

The electrode and ball shuttle and gas charge work head are then drawn upward free of the charged and sealed shock absorber assembly, the V-block lowers away from the assembly and the assembly is indexed to the next station where it may be removed from the fixture and replaced by a sealed but as yet unpressurized shock absorber assembly.

What is claimed is:

1. Apparatus for gas pressurizing a sealed shock absorber assembly, said assembly having a weldable metal outer shell, said apparatus comprising, in combination:
 - a first work station having means for piercing an opening in said weldable metal outer shell of said shock absorber assembly;
 - a second work station having chamber means for sealingly engaging a continuous annular portion of said outer shell surrounding said opening, gas charging means for passing gas through said chamber means and said pierced opening into an interior portion of said outer shell, plug handling means for moving a weldable plug into said chamber and placing said plug on said portion of said outer shell surrounding said opening and welding means for welding said plug to said outer shell to seal said pierced opening; and
 - shock absorber assembly moving means for moving a shock absorber assembly to said first work station and then to said second work station, said moving means having a plurality of shock absorber assembly holding fixtures for maintaining each shock absorber assembly in a fixed position with respect to its holding fixture;
 - whereby a sealed, unpressurized shock absorber assembly is positioned in a fixture, moved by said moving means to said first work station where an opening is pierced in the outer shell of the assembly, the moving means moves said assembly to said second work station, said shock absorber assembly is gas pressurized, a plug is placed over the pierced opening, the plug is welded to the outer shell surrounding said opening and the now gas pressurized and resealed shock absorber assembly is moved by said moving means to a position for removal from said holding fixture.

* * * * *